P. W. LITCHFIELD.
METHOD OF BUILDING TIRES OF THE SOLID TYPE.
APPLICATION FILED SEPT. 21, 1918.
1,424,134.
Patented July 25, 1922.
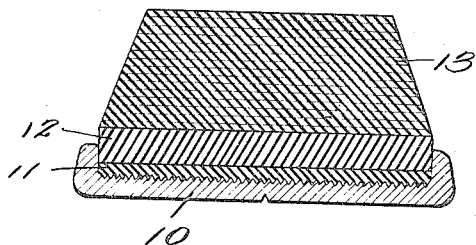
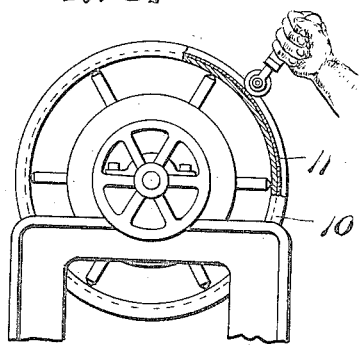
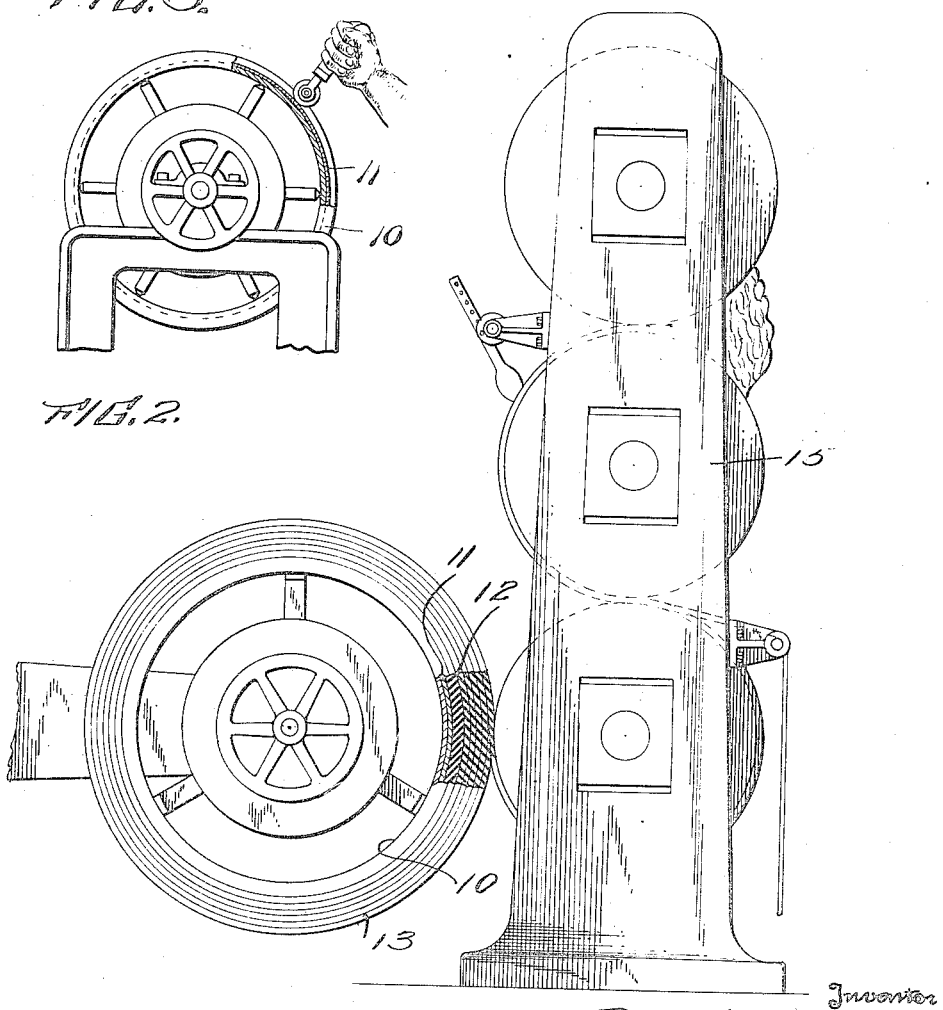
Inventor
PAUL W. LITCHFIELD.
By
Attorney

000
UNITED STATES PATENT OFFICE.

PAUL W. LITCHFIELD, OF AKRON, OHIO, ASSIGNOR TO THE GOODYEAR TIRE & RUBBER COMPANY, OF AKRON, OHIO, A CORPORATION OF OHIO.

METHOD OF BUILDING TIRES OF THE SOLID TYPE.

1,424,134.  Specification of Letters Patent.  Patented July 25, 1922.

Application filed September 21, 1918. Serial No. 255,113.

*To all whom it may concern:*

Be it known that I, PAUL W. LITCHFIELD, a citizen of the United States, and resident of Akron, Ohio, have invented new and useful Improvements in Methods of Building Tires of the Solid Type, of which the following is a specification.

My present invention relates to improvements in tires and more particularly to tires of the solid type.

In building tires of the solid type, it is the prevalent practice among manufacturers to apply a thin strip of rubber to the rim, stitch it down so as to eliminate the air between the rim and the rubber, and then apply a previously formed thick slab of a different compounded rubber to this previously applied layer. The thick slab forms the tread portion of the tire and it is either tubed or built up in laminated form and corresponds to the shape of the finished tire. When the tire receives its cure, the first applied layer of rubber, being of a different compound from that of the tread portion, cures to a harder extent and forms a bond or union between the softer tread portion and the metal rim.

Where the laminated form of tread stock is used, the rim is usually mounted in any convenient manner so that it can be rotated and as it is slowly rotated, a thin strip of rubber is wound around the first applied layer of rubber on the rim, thus forming laminations, as will be understood. The side walls of the rim usually projected far enough above the first layer of rubber to prevent the rim from receiving the thin laminations of rubber directly from the calender roll, which forms the thin strip of rubber. This, of course, necessitated another handling of the rubber as it had to be reeled up in any convenient form and then transferred to the rim.

It is the principal object of the present invention, therefore, to interpose between the first mentioned layer of rubber and the tread stock, a previously formed slab of a different compounded rubber of a thickness greater than the height of the side walls of the rim. The advantages of this is two fold; viz, building up the space between the side walls of the rim to such an extent that the rim may be held in contact with the revolving rolls of the calender and receive therefrom the thin laminations of rubber required to produce the desired thickness of the tread. It also produces a better union between the tread stock and the first mentioned layer of rubber, it having been found in practice that the severest strains between the tread stock and the first layer were experienced adjacent the union. It has also been found in practice that by interposing this intermediate slab of rubber the strains were more evenly distributed with the result that the so-called tread separation experienced is eliminated.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment as it is reduced to practice, and throughout the several views of which, similar reference numbers designate corresponding parts:

Fig. 1 represents a cross sectional view of a solid tire rim showing the positions the three separate layers of rubber assume in the finished tire;

Fig. 2 illustrates diagrammatically the position of the rim with the first and second layers of rubber positioned thereon and receiving the laminations of rubber from the calender; and Fig. 3 is a side elevational view, partly in section, illustrating the initial step of the method.

In the drawings, 10 designates a metal rim of the usual type; 11 the first strip of rubber applied thereon; 12 the intermediate layer or slab of rubber; and 13 the tread stock.

In the present embodiment of my invention, I propose to make use of any suitable means, such for instance as that shown in Fig. 3, for mounting and holding the rim while the first layer of rubber 11 is stitched thereon, and then transferring the rim so covered to a suitable standard or support disposed adjacent the calender designated as a whole as 15.

It is while the rim is in this position that the intermediate layer 12 is loosely applied and then rolled down preparatory to receiving the rubber from the calender. The next step is to move the rim to have the intermediate layer 12 contact the moving calender roll so that the rim is rotated, whereupon the thin strip of rubber produced by the calender roll can be wound on the intermediate layer 12 to form thin laminations of rubber which can be built up until the required thickness of the tread portion 13 is obtained. The thin strip of rubber is then severed and the tire removed from the calender roll for the trimming and curing operations. The intermediate layer 12 preferably consists of a rubber compound which when cured is softer than the first layer 11 of rubber on the rim, and harder than the tread portion 13.

Although I have illustrated and described the intermediate layer 12 as constituting a slab of rubber, it is to be understood that it may be built up in any desired form without departing from the spirit of the present invention and the scope of the appended claims.

What I claim is:

1. The method of building a solid tire upon a rim having circumferential edge flanges that consists in the following steps: (a) applying a thin layer of rubber compound to the rim; (b) applying thereon a slab of rubber of a different compound and of the required thickness necessary to bring its outer face at least flush with the edge flanges of the rim; and (c) applying a layer of calendered rubber of a still different compound over the tire structure thus formed.

2. The method of building a solid tire upon a rim having circumferential edge flanges that consists in the following steps: (a) stitching a thin layer of hard rubber compound to the rim; (b) applying thereon a slab of rubber of a different compound and of such thickness that the outer surface thereof is disposed beyond the outer edges of the rim flanges; and (c) superposing, by disposing the slab in rolling contact with a feeding member, a continuous winding of rubber upon the slab to form the tread portion of the tire.

3. The method of building a solid tire upon a rim having circumferential edge flanges that consists in the following steps: (a) applying a thin layer of hard rubber compound to the rim; (b) filling in the channel of the rim with a stock of rubber of a thickness not less than that required to bring the outer face thereof flush with the rim flanges; and (c) disposing the rim and stock in peripheral contact with a rotary rubber supplying member and winding a sheet of rubber therefrom around the stock.

4. The method of building a solid tire upon a rim having circumferential edge flanges that consists in the following steps: (a) applying a thin layer of hard rubber compound to the rim; (b) forming a slab of different rubber compound of such thickness that the outer surface of the slab will be disposed beyond the outer edges of the rim flanges when the slab is applied on the thin layer of hard rubber compound; (c) applying the slab on the layer of the hard rubber compound; (d) placing the rim so that the outer surface of the slab is in contact with the roll of a calender; and e simultaneously winding and pressing a calendered strip of rubber onto the slab, to form the tread portion of the tire.

5. The method of building a solid tire upon a rim having circumferential edge flanges that consists in the following steps: (a) filling in the rim channel with a layer of rubber compound of such thickness that the outer face thereof projects beyond the edges of the rim flanges; (b) disposing the rim in rotatable relation with respect to a rubber calendering roll with the face of the layer in contact therewith; and (c) simultaneously winding and pressing the sheet from the calender roll upon the stock as the rim is rotated by the roll.

6. The method of building a solid tire comprising, filling in the space between the sides of a tire rim having vertical side flanges with rubber compound to provide a resilient flush surface across the face of the rim, applying windings of material of a different rubber compound upon said flush surface through rotation of the rim, and exerting pressure against each winding as it is applied.

In witness whereof, I have hereunto signed my name in the presence of two subscribing witnesses.

PAUL W. LITCHFIELD.

Witnesses:
GEO. E. MILEY,
EDWIN J. THOMAS.